United States Patent [19]

Isozaki et al.

[11] Patent Number: 4,985,197
[45] Date of Patent: Jan. 15, 1991

[54] PROCESS FOR PREPARING HEAT SHRINKABLE POLYETHYLENE FILM

[75] Inventors: Hideo Isozaki; Tomoji Mizutani; Yoshihiro Sakamoto, all of Yatsushiro, Japan

[73] Assignee: Kohjin Co., Ltd., Tokyo, Japan

[21] Appl. No.: 360,574

[22] Filed: Jun. 2, 1989

[30] Foreign Application Priority Data

Sep. 21, 1988 [CA] Canada ................. 577989

[51] Int. Cl.$^5$ ............................. B29C 55/28
[52] U.S. Cl. ................. 264/564; 264/567; 264/235.8; 264/290.2; 425/326.1
[58] Field of Search ............... 264/560, 289.6, 562, 264/564, 519, 209.5, 567, 290.2, 235.8; 425/72.1, 326.1

[56] References Cited

U.S. PATENT DOCUMENTS

| | | | |
|---|---|---|---|
| 3,510,549 | 5/1970 | Tsuboshima et al. | 264/567 |
| 3,985,849 | 10/1976 | Notomi et al. | 264/567 |
| 4,354,997 | 10/1982 | Mizutani et al. | 264/560 |
| 4,463,153 | 7/1984 | Mizutani et al. | 526/348.1 |
| 4,597,920 | 7/1986 | Golike | 264/22 |
| 4,734,245 | 3/1988 | Takashige et al. | 264/569 |

FOREIGN PATENT DOCUMENTS

| | | | |
|---|---|---|---|
| 59-29128 | 2/1984 | Japan | 264/519 |
| 61-3728 | 1/1986 | Japan | 264/564 |
| 63-173622 | 7/1988 | Japan | 264/564 |

Primary Examiner—Jeffery Thurlow
Attorney, Agent, or Firm—Armstrong, Nikaido, Marmelstein, Kubovcik and Murray

[57] ABSTRACT

A process for preparing a heat shrinkable film which is made from a copolymer of ethylene and 0.5 to 10% by mole of an α-olefin having 4 to 12 carbon atoms, the copolymer having a g* value (i.e., intrinsic viscosity of the copolymer/intrinsic viscosity of a linear polyethylene having the same molecular weight) of 0.3 to 0.7, a melt index of 0.3 to 2.0 g/10 min., and a density at 25° C. of 0.86 to 0.92 g/cm$^3$, wherein a tubular film of the copolymer is stretched under the following conditions:

(A) the film surface temperature at the starting point of expansion being within the range of 20° to 30° C. below the melting temperature;

(B) the film in a stretching zone extending from the starting point to the finishing point of expansion having a temperature gradient such that the film surface temperature at a position of ¼ to ⅓ the vertical length (L) of the stretching zone from the starting point is maximum, and the difference between the maximum film temperature and the film temperature at the starting point of expansion being not more than 5° C.;

(C) the temperature drop of the film from the maximum temperature position to the finishing point of expansion being within the range of 15° to 20° C.; and (D) the film being cooled rapidly so that its temperature drops to a value of not more than 60° C. while traveling from the finishing point to a distnace of 0.8 time the vertical distance of the stretching zone.

2 Claims, 2 Drawing Sheets

PROCESS FOR PREPARING HEAT SHRINKABLE POLYETHYLENE FILM

BACKGROUND OF THE INVENTION

The present invention relates to a process for preparing a shrink packaging material. More particularly, the present invention relates to a process for preparing a heat shrinkable film, which has a little variation in thickness and is excellent in transparency and heat shrinkability at low temperature, and which is prepared from a resin composition containing as a main component a copolymer of ethylene and an α-olefin having a g* value as a parameter indicating straightness of molecular chain of 0.3 to 0.7.

Heretofore known are such heat shrinkable films as polyvinyl chloride films, biaxially stretched polypropylene films, polyethylene films or polyamide films and so on.

Among them, the biaxially stretched polyethylene film has been practically used because of its heat sealability and low cost. Especially, in recent years, a heat shrinkable polyethylene film prepared from a linear low density copolymer of ethylene and an α-olefin (such copolymer hereinafter referred to as "a linear low density ethylene-α-olefin copolymer") has become the object of public attention because of its excellent impact resistance and heat sealability.

Among the linear low density ethylene-α-olefin copolymers, those having a g* value, that is, $[\eta]/[\eta]_L$ of 0.3 to 0.7 have a good transparency. When preparing the heat shrinkable films therefrom according to a known tubular biaxial stretching method such as the process described in Japanese Examined Patent Publication (Tokkyo Kokoku) No. 36142/1982, in which a tubular film is extruded and biaxially stretched under gas pressure, however, because of an insufficient stretching stability and a large variation in thickness of the obtained film, a practically satisfactory film cannot be obtained.

The present inventors have been studied a process for preparing a heat shrinkable polyethylene film having little variation in thickness and a good heat shrinkability at low temperature, from the above-mentioned linear low density ethylene-α-olefin copolymer with an excellent transparency. As a result, the present invention has been accomplished.

SUMMARY OF THE INVENTION

In accordance with the present invention, there is provided a process for preparing a heat shrinkable ethylene polymer film which comprises the steps of (1) introducing a non-stretched tubular film of a resin composition comprising as a main component at least one copolymer of ethylene and 0.5 to 10% by mole of an α-olefin having 4 to 12 carbon atoms into a tubular stretching apparatus, the copolymer having a g* value, the intrinsic viscosity of the copolymer/the intrinsic viscosity of a linear polyethylene having the same weight average molecular weight as that of the copolymer, of 0.3 to 0.7, a melt index of 0.3 to 2.0 g/10 min., and a density at 25° C. of 0.86 to 0.92 g/cm³, and (2) stretching the non-stretched tubular film to give a heat shrinkable ethylene polymer film by means of a tubular stretching process under the following conditions:

(A) the film surface temperature at a starting point of expansion being within the range of 20° to 30° C. below the melting temperature [main endothermic peak temperature in a differential scanning calorimatry (DSC) curve]of the resin composition, (B) the film in a stretching zone extending from the starting point to a finishing point of expansion having a temperature gradient such that the film surface temperature at a position of ¼ to ⅓ the length (L) of the stretching zone from the starting point is maximum, and the difference between the maximum film temperature and the film temperature at the starting point of expansion being not more than 5° C., (C) the temperature drop of the film from the maximum temperature position to the finishing point of expansion being within the range of 15° to 20° C., and (D) the film being cooled to a temperature of not more than 60° C. while traveling from the finishing point to a distance of 0.8 time the vertical distance of the stretching zone.

In the above process, it is preferable to use the resin composition characterized by a differential scanning calorimetry (DSC) curve in which an endothermic area below the temperature lower than the melting temperature (main endothermic peak temperature) of the composition by 1020 C. accounts for at least 55% of the total endothermic area.

The obtained film according to the process of the present invention has little variation in thickness, is low in heat shrinkability at low temperature, and is excellent in transparency.

DETAILED DESCRIPTION

The resin composition used in the present invention is a resin composition containing as a main component at least one linear low density ethylene-α-olefin copolymer which is a copolymer of ethylene and an α-olefin having 4 to 12 carbon atoms. The linear low density ethylene-α-olefin copolymer used in the invention has a value of g*, $[\eta]/[\eta]_L$ of 0.3 to 0.7, a melt index of 0.3 to 2.0 g/10 min., and a density at 25° C. of 0.86 to 0.92 g/cm³.

The g* value is a parameter showing the degree of straightness of the molecular chain, and is defined as $[\eta]/[\eta]_L$ wherein $[\eta]$ is the intrinsic viscosity of the linear low density ethylene-α-olefin copolymer, and $[\eta]_L$ is the intrinsic viscosity of a linear polyethylene having the same weight average molecular weight as that of the linear low density ethylene-α-olefin copolymer. The value $[\eta]$is measured at 135° C. using decalin as a solvent. The value $[\eta]_L$ is calculated according to the equation:

$$[\eta]_L = 5.29 \times 10^{-4} \times <M>_w^{0.713}$$

wherein $<M>_w$ is the weight average molecular weight measured according to light scattering method.

In the ethylene-α-olefin copolymer used in the invention, when the value g* is more than 0.7, the obtained stretched film is insufficient in transparency. On the other hand, when the value g* is less than 0.3, the copolymer is insufficient in straightness so, the obtained film is inferior in mechanical strength which is the characteristic of linear low density polyethylene. In the ethylene-α-olefin copolymer, when the density of the ethylene-α-olefin copolymer used in the invention is more than 0.92 g/cm$^3$, heat shrinkability at low temperature is insufficient. On the other hand, when the density at 25° C. is less than 0.86 g/cm$^3$, the obtained film becomes too soft and the blocking tends to occur. Even when an antiblocking agent such as particles of an inorganic matter is used, the defects can be improved insufficiently.

In the ethylene-α-olefin copolymer, when the melt index is less than 0.3 g/10 min., the extrusion-load is large, so it is easy to prepare the non-stretched films having rough surface due to film-fracture. On the other hand, when the melt index is more than 2.0 g/10 min., the film-stability is poor on stretching of the film, so the thickness variation of the stretched film becomes large.

In the present invention, it is preferable to use a resin composition indicating a differential scanning calorimetry curve (hereinafter referred to as "DSC curve") wherein the endothermic area under the temperature lower than the melting temperature (main endothermic peak temperature) of the resin composition by 10° C. accounts for at least 55% of the total endothermic area, since such a composition is excellent in stretching stability within a relatively wide temperature range.

Figure 1:
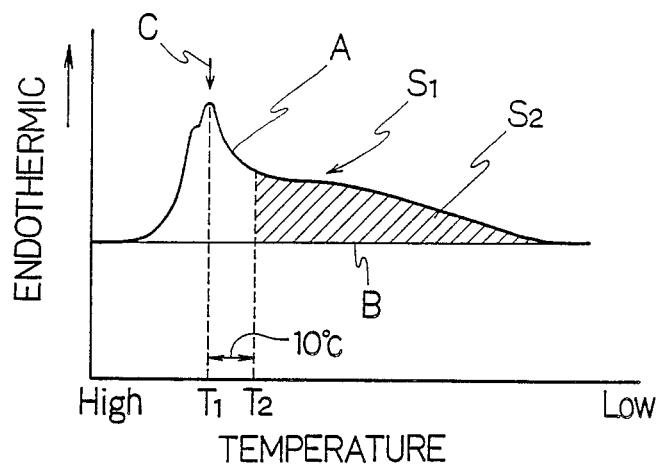
FIG. 1 is a schematic graph showing a differential scanning calorimetry curve of a resin composition for explaining a manner of determining the endothermic area ratio defined above.

The definitions of the above measurements are explained by referring to FIG. 1 which is a schematic graph showing a DSC curve of a composition. In FIG. 1, the curve A is DSC curve and the straight line B is a base line. The main endothermic peak in DSC curve is indicated by the arrow C.

Melting temperature:
The melting temperature is expressed in terms of main endothermic peak temperature $T_1$ corresponding to the main endothermic peak C.

Total endothermic area:
The total endothermic area $S_1$ means the area of the portion which is surrounded by the DSC curve A and the base line B.

Endothermic area below the temperature lower than the melting temperature (main endothermic peak temperature) by 10° C. (hereinafter referred to as "endothermic area $S_2$"):
The endothermic area $S_2$ is the area of the shadowed portion in FIG. 1. That is, the endothermic area $S_2$ means the area of a portion which is surrounded by the DSC curve A and the base line B and exists on the low-temperature side with respect to the temperature $T_2$ lower than the melting temperature $T_1$ by 10° C.

For the above-mentioned determination with a differential scanning calorimeter using a DSC-200 differential scanning calorimeter made by Seiko Denshi Kogyo Kabushiki Kaisha, 6 to 8 mg of a sample was sealed in an aluminum pan, heated in a nitrogen stream up to 190° C. and held at this temperature for 1 hour. Thereafter, the temperature was reduced at a rate of about 10° C./min. down to room temperature and, then, a DSC curve is recorded at a temperature increasing rate of 10° C./min. up to a temperature of 190° C.

Examples of the α-olefin having 4 to 12 carbon atoms in the linear low density ethylene-α-olefin copolymer used in the present invention are, for instance, butene-1, pentene-1, hexene-1, heptene-1, octene-1, 4-methylpentene-1, decene-1, undecene-1, dodecene-1, and the like.

The δ-olefin content in the copolymer is preferably in the range of 0.5 to 10% by mole, more preferably from 1 to 10% by mole.

Within the range not detrimental to the objects of the present invention, ethylene polymers such as high pressure polyethylene, ethylene-vinyl acetate copolymer, ionomers and ethylene-propylene copolymer, and additives such as lubricating agents, antiblocking agents, antistatic agents can be incorporated in the resin composition in addition to the above-mentioned linear low density ethylene-α-olefin copolymer.

Figure 2:
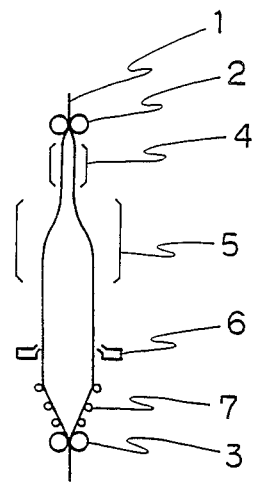
FIG. 2 is a schematic diagram showing a tubular stretching apparatus used in Examples.
Figure 3:
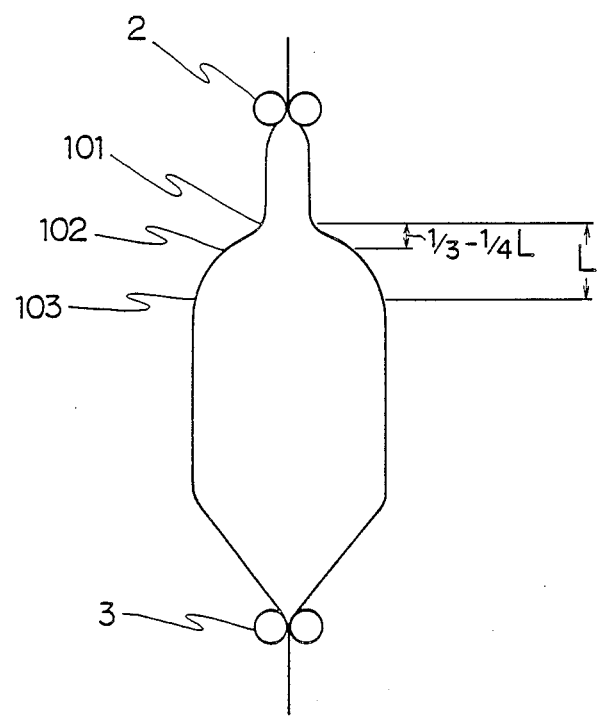
FIG. 3 is a magnified diagram of the stretching part of the apparatus shown in FIG. 2.

Hereinafter, procedures for producing the heat shrinkable polyethylene film according to the process of the present invention is explained with reference to FIG. 2 and FIG. 3. FIG. 2 is a schematic diagram showing a tubular stretching apparatus. FIG. 3 is a magnified diagram of the stretching part of the apparatus.

The above-specified resin composition is melt-extruded into a tube, which is then solidified by rapidly cooling in a known method to give a material film which is a substantially non-stretched film.

The thus obtained non-stretched tubular film 1 is fed to a stretching apparatus such as shown in FIG. 2, by which the tubular non-stretched film is expanded and stretched between a pair of low-speed nip rolls 2 and a pair of high-speed nip rolls 3, introducing air into the non-stretched tubular film under pressure to form the bubble.

In the process of the invention, the film temperature at the starting point of expansion 101 is falls within the temperature range of 20° to 30° C. below the melting temperature (main peak temperature in the DSC chart) of resin composition. This temperature range can be adjusted by adjusting the pressure of the air to be introduced into the tube and controlling heaters 4 and 5 and a cooling air ring 6.

When the film temperature at the starting point of expansion 101 is higher than the above range, in the starting point of expansion and its vicinity, the film becomes too soft and the stretching tension is lowered to cause an abnormal expansion resulting in ununiform stretching. Further, in such a case, the orientation effect due to the stretching is decreased and the strength and heat shrinkability of the stretched film are lowered. On the other hand, when the film temperature at the starting point of expansion 101 is lower than the range above, the film enters in the state of the so-called neck stretching, and the obtained film has large variation in thickness and is poor in transparency. Further, in such a case, the internal pressure of the bubble becomes too high, and there is increased the frequency of the break of the film, i.e. the puncture of the bubble.

Further, in the present invention, in order to uniformly stretch the film and make the thickness variation of the stretched film smaller, the expansion and extension of the tubular film is carried out with a temperature gradient such that the film in a stretching zone extending from the starting point of expansion 101 to a finishing point of expansion 103 reaches the maximum temperature at the position of $\frac{1}{4}$ to $\frac{1}{3}$ the length (L) of the stretching zone from the starting point 101, the difference between the maximum temperature and the temperature of the film at the starting point 101 is not more than 5° C., and the temperature drop of the film from the maximum temperature position 102 to the finishing point 103 is in the range of 15° C. to 20° C. Then, the temperature gradient of the films is further maintained so that while the film travels from the finishing point of expansion 103 to a distance of 0.8 time the vertical distance of the stretching zone, the temperature of the film drops to not more than 60° C.

When the difference between the maximum temperature and the temperature at the starting point of expansion 101 is higher than 5° C., the tensile strength of the film becomes small, so the heat shrinkability of the stretched film tends to be lowered, and the bubble easily fluctuates because of the unstable expansion of the bubble. When the temperature gradient during travelling of the film from the starting point of expansion 101 to the position of ¼ to ⅓ the length (L) of the stretching zone is downward gradient, though the stability of stretching of the bubble is improved, well-balanced stretching in the machine and transverse directions cannot be obtained. Therefore in both the cases the thickness variation becomes large and the objects of the present invention cannot be sufficiently attained.

Further, when the film temperature drop between the maximum temperature position 102 and the finishing point of expansion 103 is less than 15° C., the bubble becomes unstable, which causes the large thickness variation. On the other hand, when the film temperature drop is more than 20° C., the internal pressure of the bubble increases abnormally, the stability at the starting point of expansion 101 is broken, so the upper portion of the bubble sways to cause the large thickness variation.

Moreover, for obtaining the stability of the bubble, the film temperature is suddenly dropped after passing the film the finishing point of expansion 103. That is, the film is rapidly cooled so that the film temperature is dropped to not more than 60° C. while the film travels from the finishing point of expansion 103 to a distance of 0.8 time the length (L) of the stretching zone. When the above-mentioned sudden drop of the film temperature is not conducted, swaying of the whole bubble occurs, thereby causing local unevenness of stretching, and the thickness variation of the obtained film becomes large.

By specifying the film temperature gradient during the stretching step as described above, the stability of the bubble in expanding and stretching can be improved and, as a result, the stretched film with small variation in thickness can be obtained.

As described above, the linear low density ethylene-α-olefin copolymer having the comparatively small g* value such as from 0.3 to 0.7 is excellent in transparency, but it is difficult to stably stretch it in the form of the bubble under the conventionally known conditions for stretching the linear low density polyethylene. By applying the process of the present invention to such ethylene polymers, the stretching can be made stable, and the film small in thickness variation and excellent in practical use can be obtained.

The present invention is more specifically described and explained by means of the following Examples. It is to be understood that the present invention is not limited to those Examples, and various changes and modifications may be made without departing from the scope or spirit of the present invention.

The quantitative data given in the examples were determined by the following methods.

1. Heat shrinkage

A square specimen having a size of about 10 cm × about 10 cm was cut out of each sample film. The length (A cm) of each side of the specimen is accurately measured down to the second decimal place (0.1 mm). The specimen is immersed in a glycerin bath maintained at a prescribed temperature for 10 seconds, taken out and washed gently with water having room temperature. The length (A' cm) of each side is measured accurately and the heat shrinkage is calculated according to the following equation:

$$\text{Heat shrinkage (\%)} = \frac{A - A'}{A} \times 100$$

wherein A is the average length (cm) of the two sides before immersion and A is the average length (cm) of the two sides after immersion.

2. Film temperature

By employing a chromel-constantan thermocouple (0 to 100 ohms) having a diameter of about 1 mm and a length of exposed portion of about 15 mm, C-505 thermocouple made by Anritsu Keiki Kabushiki Kaisha, the nose of the thermocouple is contacted with the surface of a film traveled, and the value after 30 seconds is regarded as the film temperature.

3. Thickness variation of film

The thickness of the stretched film having a length of 25 cm is recorded with a continuous thickness meter made by Anritsu Keiki Kabushiki Kaisha at a rate of 300 cm/min.. From the obtained chart, the maximum thickness ($T_{max}$) and the minimum thickness ($T_{min}$) are determined. The thickness variation is determined as follows:

$$\text{Thickness variation (\%)} = \pm \frac{(T_{max}) - (T_{min})}{(T_{max}) + (T_{min})} \times 100$$

4. Transparency (haze)

The transparency is a percentage of a transmission of scattered light to a transmission of parallel ray. The transmissions are measured by using an integrating shere light transmission measuring device conforming to JIS K 6714.

5. Value g*

The g* value is defined as follows:

$$g^* = [\eta]/[\eta]_L$$

wherein $[\eta]$ is the intrinsic viscosity of a copolymer which is measured by dissolving it at 135° C. in decalin as a solvent; and $[\eta]_L$ is the intrinsic viscosity of a linear polyethylene having the same weight average molecular weight as that of the copolymer, which is calculated according to the following equation.

$$[\eta]_L = 5.29 \times 10^{-4} \times <M>_w^{0.713}$$

wherein $<M>_w$ is the weight average molecular weight of the copolymer measured according to light scattering method.

6. The endothermic area ratio is defined as follows:

$$\text{Endothermic area ratio (\%)} = \frac{\text{Endothermic area } S_2}{\text{Total endothermic area } S_1} \times 100$$

EXAMPLE 1

A linear copolymer of ethylene and octene-1 having a g* value of 0.59, a melting temperature of 125° C., a density at 25° C. of 0.915 g/cm³ and a melt index of 1.0 g/10 min. was melt-extruded through a tubular die with a diameter of 66 mm, and the extruded tubular film, both its outer surface and its inner surface, was cooled rapidly with water to give a tubular non-stretched film with a diameter of 65 mm and a thickness of 370 μm. The DSC curve of this copolymer showed that the endothermic area ratio was 58.9%.

The obtained non-stretched film 1 was fed to a tubular stretching apparatus running vertically as shown in FIG. 2 where the film was expanded and stretched. While adjusting the preheater 4, the main heater 5 equipped with eight circular infrared heaters grouped in 4 sections and the cooling air ring 6 from which a cold air can be blown upward were adjusted, pressurized air was blown into the tubular film, the bubble between the low-speed nip rolls 2 and the high-speed nip rolls 3 with adjusting the air pressure to form a stretched bubble. In the above stretching apparatus, a biaxially stretched film was produced under the conditions shown in Table 1 at a take-off rate of 16 m/min. stably for a long time. The stretched film was collapsed through collapser rollers 7.

The vertical length of stretching zone L was about 21 cm, the puter diameter of the bubble was 240 mm, and the point at which the film had the maximum temperature was about 6.0 cm below the starting point of expansion 101.

The biaxially stretched film was guided to a tubular annealing apparatus adjusted to 70° C., annealed for 10 seconds, and cooled to room temperature. The cooled film was collapsed again, drawn out and wound up.

The thickness, thickness variation, transparency (haze) and heat shrinkage of the resulting film were measured. The results are shown in Table 1.

EXAMPLE 2

Using a linear copolymer of ethylene and butene-1 having a g* value of 0.65, a melting temperature of 118.7° C., a density at 25° C. of 0906 g/cm$^3$ and a melt index of 0.8 10 min., a tubular non-stretched film with a diameter of 65 mm and a thickness of 359 μm was prepared in the same manner as in Example 1. The DSC curve of this copolymer showed that the endothermic area ratio was 53%.

The bubble formation and the stretching was conducted in the same manner as in Example 1 except that the non-stretched film obtained as above was used and the stretching was conducted under the conditions shown in Table 1 to prepare a biaxially stretched film at a take-off rate of 13 m/min. stably for a long time.

The vertical length of stretching zone L was about 20.5 cm, the outer diameter of the bubble was 250 mm, and the point where the film had the maximum temperature was about 5.8 cm below the starting point of expansion 101.

The biaxially stretched film was guided to the tubular annealing apparatus adjusted to 70° C., annealed for 10 seconds, and cooled to room temperature. The cooled film was collapsed again, drawn out and wound up.

The thickness, thickness variation, transparency (haze) and heat shrinkage of the resulting film were measured. The results are shown in Table 1.

EXAMPLE 3

To a linear copolymer of ethylene and butene-1 having a g* value of 0.45, a melting temperature of 116° C., a density at 25° C. of 0.89 g/cm$_3$ and a melt index of 1.0 g/10 min. was added 0.3%, of the copolymer, of solid silica particles (commercially available under the trade name "Syloid #244" made by Fuji Devison Kabushiki Kaisha) to give a resin composition. Using the obtained composition, a tubular non-stretched film with a diameter of 65 mm and a thickness of 385 μm was prepared in the same manner as in Example 1. The DSC curve of this composition showed that the endothermic area ratio was 56%.

The bubble formation and the stretching was conducted in the same manner as in Example 1 except that the non-stretched film obtained as above was used and the stretching was conducted under the conditions shown in Table 1 to prepare a biaxially stretched film at a take-off rate of 15 m/min. stably for a long time.

The vertical length of stretching zone L was about 20.2 cm, the outer diameter of the bubble was 250 mm, and the point where the film had the maximum temperature was about 5.4 cm below the starting point of expansion.

The biaxially stretched film was guided to the tubular annealing apparatus thermostated at 70° C., annealed for 10 seconds, and cooled to room temperature. The cooled film was collapsed again, drawn out and wound up.

The thickness, thickness variation, transparency (haze) and heat shrinkage of the resulting film were measured. The results are shown in Table 1.

COMPARATIVE EXAMPLE 1

Using a linear copolymer of ethylene and butene-1 having a g* value of 0.89, a melting temperature of 122° C., a density at 25° C. of 0.923 g/cm$^3$ and a melt index of 0.8 g/10 min., a tubular unstretched film with a diameter of 65 mm and a thickness of 366 μm was prepared in the same manner as in Example 1. The DSC curve of this composition showed that the endothermic area ratio was 63.8%.

The bubble formation and the stretching was conducted in the same manner as in Example 1 except that the non-stretched film obtained as above was used and the stretching was conducted under the conditions shown in Table 1 to prepare a biaxially stretched film at a take-off rate of 16 m/min. stably for a long time.

The vertical length of stretching zone L was about 21.0 cm, the outer diameter of the bubble was 241 mm, and the point where the film had the maximum temperature was about 6.2 cm below the starting point of expansion 101.

The biaxially stretched film was guided to the tubular annealing apparatus adjusted to 70° C., annealed for 10 seconds, and cooled to room temperature. The cooled film was collapsed again, drawn out and wound up.

The thickness, thickness variation, transparency (haze) and heat shrinkage of the resulting film were measured. The results are shown in Table 1.

From the results shown in Table 1, it would be understood that the film obtained in Comparative Example 1 is not affected in stability of the bubble, but it has large variation in thickness, and is insufficient in transparency such as having a haze of 8%.

COMPARATIVE EXAMPLE 2

Using a linear copolymer of ethylene and octene-1 having a g* value of 0.92, a melting temperature of 126° C., a density at 25° C. of 0.92 g/cm$^3$ and a melt index of 1.0 g/10 min., a tubular non-stretched film with a diameter of 65 mm and a thickness of 366 μm was prepared in the same manner as in Example 1. The DSC curve of this copolymer showed that the endothermic area ratio of 59.4%.

The bubble formation and the stretching was conducted in the same manner as in Example 1 except that the non-stretched film obtained as above was used and the stretching was conducted under the conditions shown in Table 1 to prepare a biaxially stretched film at a take-off rate of 15 m/min. stably for a long time. The stability of bubble was rather insufficient and the obtained film was much variation in thickness.

The vertical length of stretching zone L was about 21.0 cm, the outer diameter of the bubble was 234 mm, and the point where the film had the maximum temperature was about 6.2 cm below the starting point of expansion.

The biaxially stretched film was guided to the tubular annealing apparatus adjusted to 70° C., annealed for 10 seconds, and cooled to room temperature. The cooled film was collapsed again, drawn out and wound up.

The thickness, thickness variation, transparency (haze) and heat shrinkage of the resulting film were measured. The results are shown in Table 1.

COMPARATIVE EXAMPLE 3

The tubular non-stretched film with a diameter of 65 mm and a thickness of 370 μm was prepared in the same manner as in Example 1 from the same linear low density copolymer of ethylene and octene-1 as used in Example 1.

The tubular non-stretched film was expanded and stretched in the same manner as in Example 1 except that the temperature at the starting point of expansion 101 and the maximum temperature in the stretching were set higher than those defined as in the present invention, that is, the stretching was conducted under the conditions shown in Table 1 to prepare a biaxially stretched film at a take-off rate of 16 m/min..

The biaxially stretched film could not be produced for a long time continuously, since during the preparation of the film, the bubble was abnormally expanded and unstable.

COMPARATIVE EXAMPLE 4

The tubular non-stretched film with a diameter of 65 mm and a thickness of 370 μm was prepared in the same manner as in Example 1 from the same linear low density copolymer of ethylene and octene-1 as used in Example 1.

The tubular non-stretched film was expanded and stretched in the same manner as in Example 1 except that the temperature at the starting point of expansion and the maximum temperature were set lower than those defined as the present invention, that is, the stretching was conducted under the conditions shown in Table 1 to prepare a biaxially stretched film at a take-off rate of 16 m/min..

During the film preparation, necking occurred in the bubble. Only a film unsuitable for practical use was obtained.

COMPARATIVE EXAMPLE 5

The tubular non-stretched film with a diameter of 65 mm and a thickness of 360 μm was prepared in the same manner as in Example 2 from the same linear low density copolymer of ethylene and butene-1 as used in Example 2.

The tubular non-stretched film was subjected to a tubular biaxial stretching in the same manner as in Example 2 except that the cooling after expansion was insufficient. The bubble showed swinging and stable stretching could not be continued.

TABLE 1

| | Ex. 1 | Ex. 2 | Ex. 3 | Com. Ex. 1 | Com. Ex. 2 | Com. Ex. 3 | Com. Ex. 4 | Com. Ex. 5 |
|---|---|---|---|---|---|---|---|---|
| Resin composition | | | | | | | | |
| g* value | 0.59 | 0.65 | 0.45 | 0.89 | 0.92 | 0.59 | 0.59 | 0.65 |
| Melting temperature (°C.) | 125.0 | 118.7 | 116 | 122 | 126 | 125.0 | 125.0 | 118.7 |
| Density at 25° C. (g/cm$^3$) | 0.915 | 0.906 | 0.89 | 0.923 | 0.920 | 0.915 | 0.915 | 0.906 |
| Melt index (g/10 min.) | 1.0 | 0.8 | 1.0 | 0.8 | 1.0 | 1.0 | 1.0 | 0.8 |
| Endothermic area ratio (%) | 58.9 | 53 | 56 | 63.8 | 59.4 | 58.9 | 58.9 | 53 |
| Tubular non-stretched film | | | | | | | | |
| Diameter (mm) | 65 | 65 | 65 | 65 | 65 | 65 | 65 | 65 |
| Thickness (μm) | 370 | 359 | 385 | 366 | 366 | 370 | 370 | 360 |
| Conditions of stretching | | | | | | | | |
| Rate of feeding the non-stretched film (m/min.) | 3.6 | 2.9 | 3.2 | 3.6 | 3.6 | 3.6 | 3.6 | 2.7 |
| Vertical length of stretching zone (L) (mm) | 210 | 205 | 202 | 210 | 210 | 210 | 220 | 180 |
| Temperature at the starting point of expansion (°C.) | 99 | 94 | 92 | 97 | 103 | 111 | 93 | 94 |
| Conditions of stretching | | | | | | | | |
| The maximum temperature (°C.) | 102 | 98 | 96 | 100 | 107 | 115 | 97 | 98 |
| Distance between the starting point of expansion and the maximum temperature position (mm) | 60 | 58 | 54 | 62 | 62 | 62 | 58 | 55 |
| Temperature at the finishing point of expansion (°C.) | 86 | 80 | 78 | 84 | 89 | 97 | 80 | 87 |
| Temperature at the point 0.8 L from the finishing point of expansion (°C.) | 55 | 55 | 56 | 58 | 58 | 58 | 57 | 70 |
| Outer diameter of the stretched bubble (mm) | 240 | 250 | 250 | 241 | 234 | ** | ** | ** |
| Take-off rate (m/min.) | 16 | 13 | 15 | 16 | 15 | 16 | 16 | 13 |
| Stability of bubble* | | -Δ | | | Δ | X | X | X |
| Biaxially stretched film thickness (μm) | 22.5 | 20.8 | 21.3 | 22.2 | 24.4 | — | — | — |

TABLE 1-continued

|  | Ex. 1 | Ex. 2 | Ex. 3 | Com. Ex. 1 | Com. Ex. 2 | Com. Ex. 3 | Com. Ex. 4 | Com. Ex. 5 |
| --- | --- | --- | --- | --- | --- | --- | --- | --- |
| Thickness variation (%) | ±8 | ±11 | ±9 | ±18 | ±15 | — | — | — |
| Haze (%) | 3.1 | 2.8 | 3.2 | 8 | 5 | — | — | — |
| Heat shrinkage |  |  |  |  |  |  |  |  |
| at 70° C.MD (%) | 5.9 | 7.2 | 8.4 | 3.1 | 3.5 | — | — | — |
| TD (%) | 6.4 | 7.5 | 8.5 | 5.6 | 6.5 | — | — | — |
| at 80° C.MD (%) | 8.8 | 10.3 | 11.5 | 15.3 | 17.4 | — | — | — |
| TD (%) | 12.2 | 13.5 | 12.1 | 25.1 | 27.0 | — | — | — |
| at 100° C.MD (%) | 27.6 | 34.8 | 35.0 | 45.2 | 49.6 | — | — | — |
| TD (%) | 36.9 | 42.5 | 40.4 | 44.6 | 49.5 | — | — | — |

(Notes):
**During the expansion and stretching, the outer diameter of bubble was constantly varying.
*Estimation of Stability of bubble
 : The bubble was stable in a stationary state during the stretching.
Δ: The bubble was sometimes slightly swinging during the stretching.
X: The bubble was very much swinging during the stretching.
MD: Machine direction
TD: Transverse direction The thus prepared heat shrinkable film according to the present invention has little variation in thickness and is excellent in uniformity. So, the film can be treated smoothly in a laminating step with other films or a wrapping or packaging step. Moreover, the film is excellent in transparency and heat-sealability, so it can be utilized as packaging materials.

What is claimed is:

1. A process for preparing a heat shrinkable ethylene polymer film, which comprises the steps of:

(1) introducing into a tubular stretching apparatus a non-stretched tubular film of a resin composition comprising as a main component at least one copolymer of ethylene and 0.5 to 10% by mole of an α-olefin having 4 to 12 carbon atoms, said copolymer having a g* value of 0.3 to 0.7, wherein said g* value is the ratio of the intrinsic viscosity of the copolymer to the intrinsic viscosity of a linear polyethylene having the same weight average molecular weight as that of said copolymer, and said copolymer having a melt index of 0.3 to 2.0 g/10 min., and a density of 25° C. of 0.86 to 0.92 g/cm$^3$; and (2) stretching said non-stretched tubular film to give said heat shrinkable ethylene polymer film by means of a tubular stretching process under the following conditions:

(A) the film surface temperature at the staring point of expansion of the tubular film being within the range of 20° to 30° C. below the ;melting temperature of said resin composition, said melting temperature being the main endothermic peak temperature in a differential scan calorimetry (DSC) curve of said resin composition;

(B) the film in a stretching zone extending from the starting point to the finishing point of expansion having a temperature gradient such that the film surface temperature at a position of ¼ to ⅓ the vertical length (L) of the stretching zone from the starting point is maximum, and the difference between the maximum film temperature and the film temperature at the starting point of expansion being not more than 5° C.;

(C) the temperature drop of the film from the maximum temperature position to the finishing point of expansion being within the range of 15° to 20° C.; and (D) the film being cooled rapidly so that its temperature drops to a value of not more than 60° C. while traveling from the finishing point to a distance of 0.8 time the vertical distance of the stretching zone.

2. The process of claim 1, wherein said resin composition is characterized by a differential scan calorimetry (DSC) curve in which the endothermic area below the temperature lower than the melting temperature of the composition by 10° C. accounts for at least 55% of the total endothermic area, said melting temperature being the main endothermic peak temperature.

* * * * *